United States Patent [19]

Haggerty

[11] Patent Number: 4,880,319

[45] Date of Patent: Nov. 14, 1989

[54] BEARING ASSEMBLY

[75] Inventor: John A. Haggerty, Norton, Ohio

[73] Assignee: The B. F. Goodrich Company, Akron, Ohio

[21] Appl. No.: 859,677

[22] Filed: May 5, 1986

[51] Int. Cl.$^4$ ............................................. F16C 33/22
[52] U.S. Cl. .................................... 384/215; 384/220; 384/297
[58] Field of Search ............... 384/125, 215, 220, 221, 384/222, 247, 261–266, 271, 274, 297, 299, 300, 903; 267/276, 292; 280/717

[56] References Cited

U.S. PATENT DOCUMENTS

| | | | |
|---|---|---|---|
| 2,732,267 | 1/1956 | Stover | 384/274 X |
| 2,853,325 | 9/1958 | Ward | 384/222 X |
| 3,336,021 | 8/1987 | Kramer | 267/1 |
| 3,770,291 | 11/1973 | Kramer | 280/124 B |
| 4,401,198 | 8/1983 | Kunczynski | 384/125 X |

Primary Examiner—Stuart S. Levy
Assistant Examiner—Thomas R. Hannon
Attorney, Agent, or Firm—Joseph Januszkiewicz

[57] ABSTRACT

A bearing assembly for a suspension system having a torsilastic spring including a pair of diametrically opposed tapered elastomeric thrust rings operative to take up thrust forces as well as forces normal to the axial centerline of such elastomeric thrust rings. The elastomeric rings are under compression and take up axial thrust forces and rotation forces.

7 Claims, 3 Drawing Sheets

BEARING ASSEMBLY

BACKGROUND OF THE INVENTION

This invention relates to a bearing assembly and more particularly to a new and improved bearing assembly for use in supporting a vehicle wheel mounting that is subjected to various forces including thrust forces.

In vehicle suspension systems the drive wheels are connected to axles via suitable mounting means as well as to suspension means. Such mounting means or support are subjected to complex forces because of their need to accommodate the rotative forces, thrust forces and those encountered due to the vehicle wheel traversing uneven terrain, skidding, braking and acceleration forces including those encountered as in cornering. The mounting support which includes the wheel brake support which houses ordinarily a complex roller and thrust bearing assembly takes up critical area, is expensive and undergoes complex dynamic forces. The present invention is directed to a new and improved bearing assembly for use in supporting the wheel and wheel brake support which is cost effective and particularly unique for such an application as where the wheel brake support is also connected to the suspension system. The present invention is explained in cooperation with a suspension system using a torsilastic spring; however, the application of the bearing unit is equally applicable to other suspension systems and to other applications.

SUMMARY OF THE INVENTION

The present invention contemplates the use of a rubber torsion spring in a suspension system for a vehicle wherein the torsion spring, under compression, employs a pair of diametrically opposed tapered elastomeric rings that operate to take up thrust and axial forces. The torsion spring also takes up rotational forces.

DESCRIPTION OF THE PREFERRED EMBODIMENT

Figure 1:
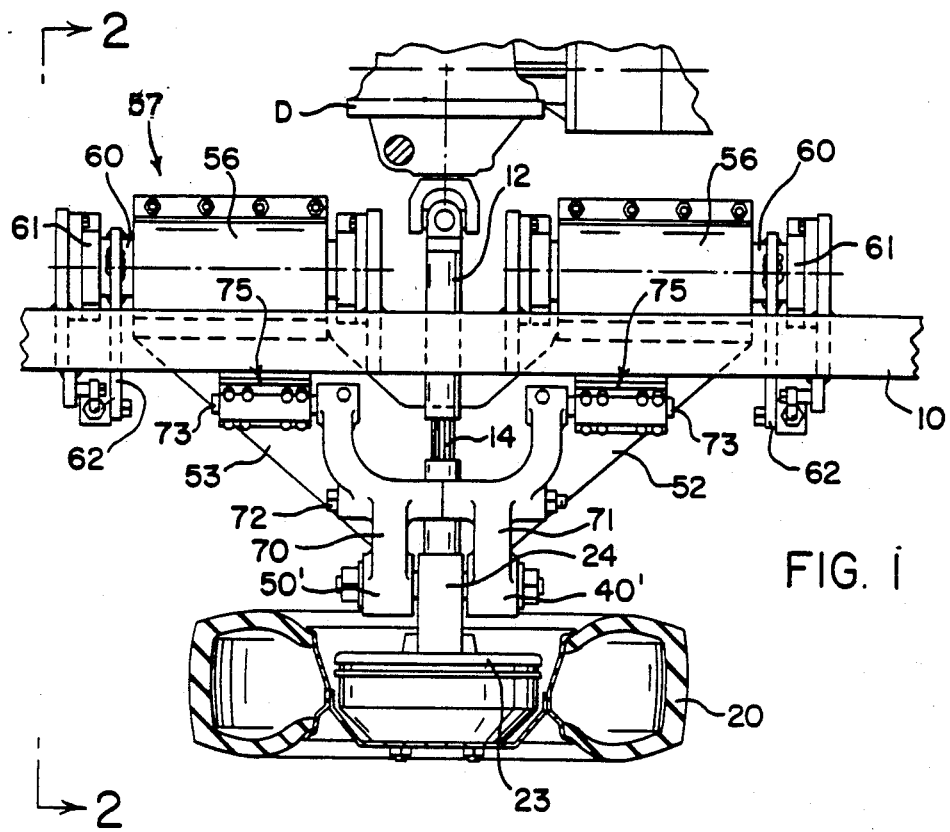
FIG. 1 is a plan view of a portion of a vehicle suspension system for a drive axle and a wheel support.

Referring now to the drawings wherein like reference numerals designate like or corresponding parts throughout the several views, there is shown in FIG. 1 a support member 10 which is one of a pair of laterally spaced parallel support members which are part of the main support frame or chassis of a vehicle such as a motor home. Suitably mounted on the support frame of the vehicle is a motor and transmission means connected to a differential D whose drive output in turn is connected to a pair of laterally extending axles only one shown as 12. Such drive axles are connected via splined shafts 14 to rotate wheels (only wheel 20 shown) in a manner old and well known in the art.

Figure 2:
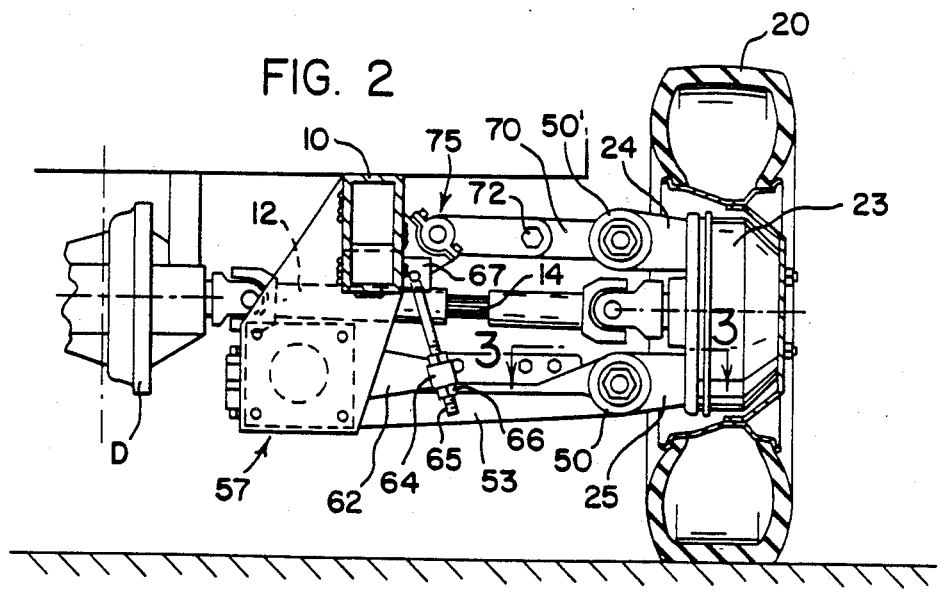
FIG. 2 is a side elevational view of the suspension system and drive wheel taken on line 2—2 of FIG. 1.
Figure 3:
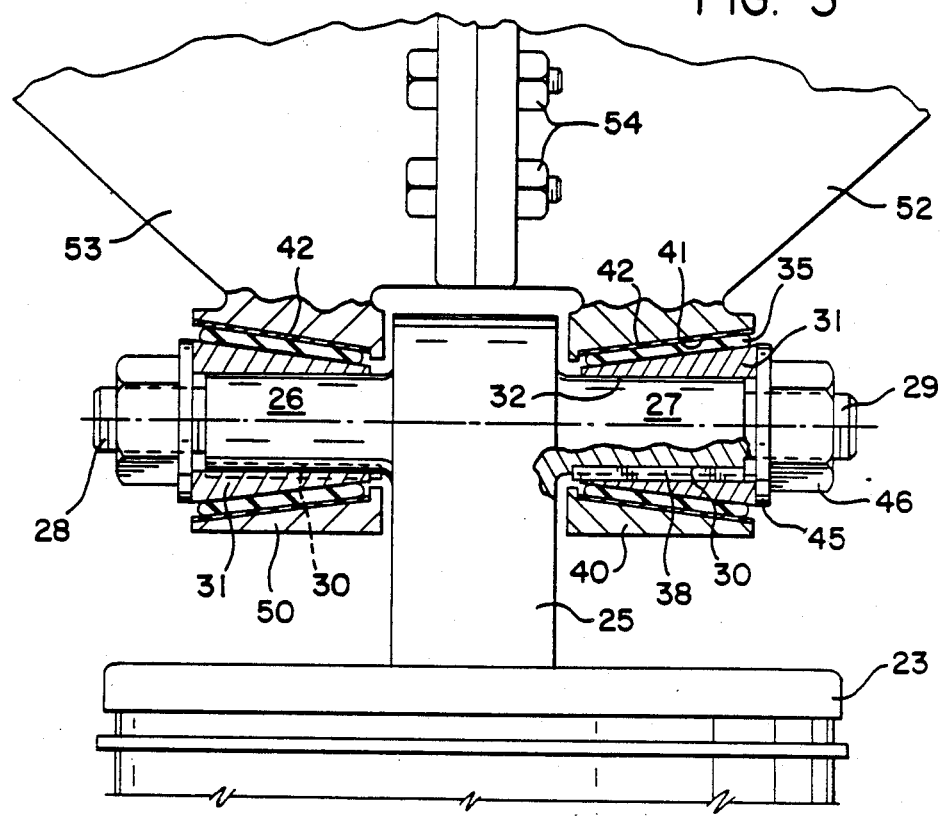
FIG. 3 cross sectional view of the wheel brake support and the bearing assembly taken on line 3—3 of FIG. 2.
Figure 4:
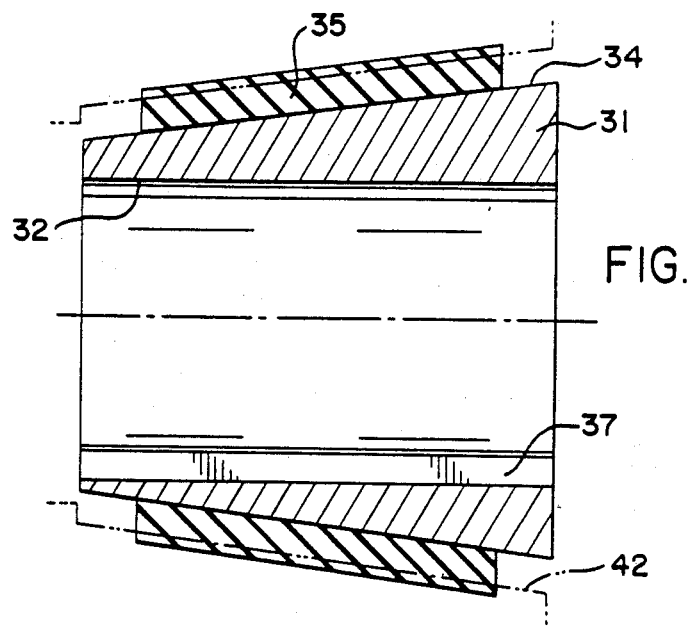
FIG. 4 is an enlarged cross sectional view of a portion of the bearing assembly shown in FIG. 3 prior to mounting of the elastomeric ring within the outer bearing housing.
Figure 5:
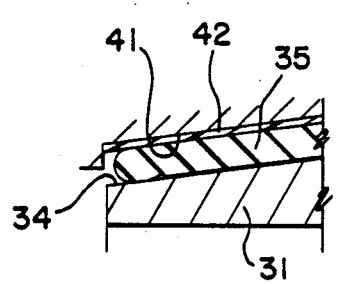
FIG. 5 is an enlarged cross sectional view of that portion of the bearing ring shown in FIG. 4 after mounting within the outer housing.
Figure 6:
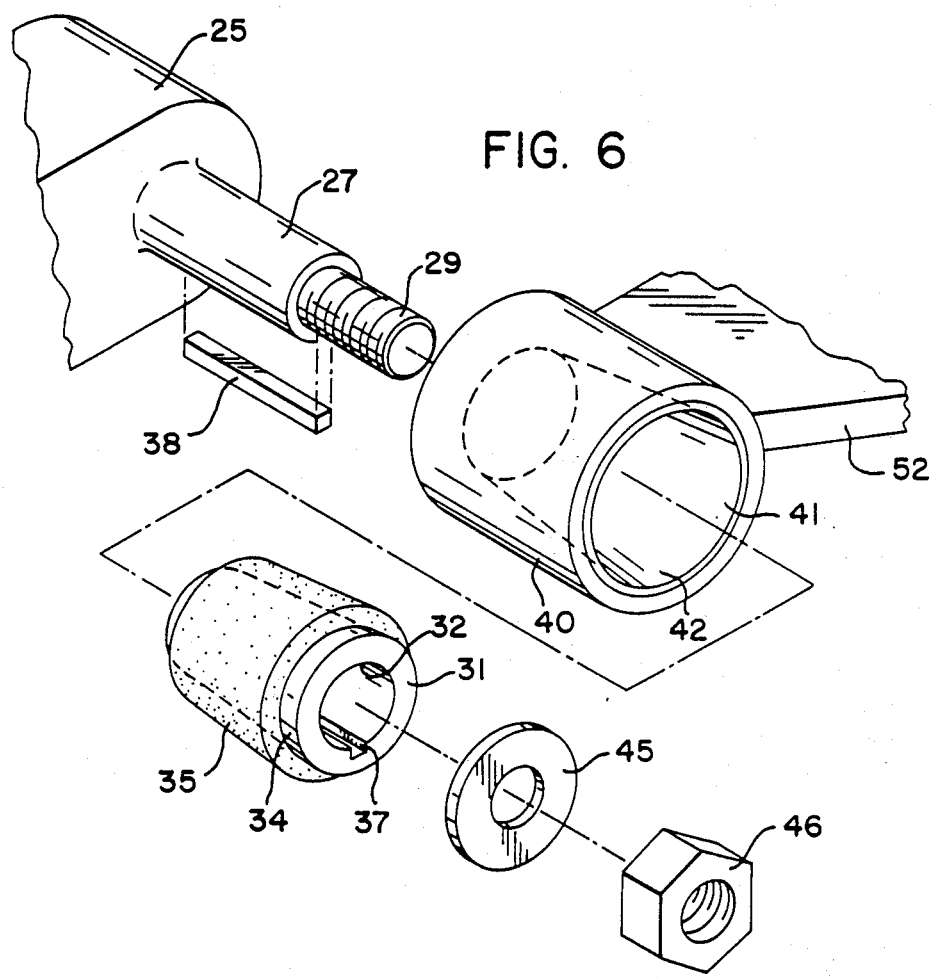
FIG. 6 is an exploded diagrammatic view of a portion of a bearing assembly as to be mounted on a wheel support bracket.

Wheel 20 has a brake drum housing or wheel bracket 23 (FIG. 2) which has an upper extension bracket 24 (FIGS. 2 and 5) and a lower extension bracket 25 (FIGS. 2 and 3). Lower bracket 25 has a pair of laterally extending shafts 26 and 27 whose respective end portions are threaded as at 28 and 29. Such shafts 26 and 27 are cylindrical and have keyways 30. A hub or sleeve 31 is mounted on each shaft 26 and 27. Hub 31 has a cylindrical central bore 32 and an outer tapered surface 34. Such sleeve 31 is a frusto-conical configuration. An elastomeric annular conical ring 35 is bonded to the outer tapered surface 34 of sleeve or hub 31. Sleeve 31 has a keyway 37 which is aligned with keyway 30 in shaft 27 which on receiving key 38 interconnects shaft 27 to sleeve 31. In the same manner, shaft 26 is interconnected to its sleeve 31 via key and aligned keyways as shown in FIG. 3. Tapered or conical ring 35 as mounted with sleeve 31 on shaft 27 is compressed by an outer hub 40 which has a central bore 41 with a conical taper. Such bore 41 is of a frusto-conical configuration. The inner surface of conical central bore 41 has anti-friction material 42 such as Teflon ® coated thereon, which provides a smooth sliding surface for the elastomeric ring 35. Once the elastomeric ring 35 is compressed by hub 40, a washer 45 and nut 46 is threaded onto threaded end 29 of shaft 27 to provide the necessary compression onto the ring 35 in a manner to be described.

In a similar manner, an elastomeric ring 35 with sleeve 31 is mounted on shaft 26 which receives a hub 50 having a central bore coated with a similar anti-friction material 42 as in hub 40.

Hubs 40 and 50, respectively, are connected to control arms 52 and 53, respectively. Each control arm 52 and 53 has an upwardly extending web portion with aligned bores to accommodate bolts 54 to firmly secure such control arms 52 and 53 together. The other end of each control arm 52 and 53 terminates into an arcuate segment which houses a torsion spring 57 in cooperation with an upper housing segment 56. The torsion spring 57 has an annular elastomeric sleeve that is bonded to the outer arcuate segments including segment 56 which thus is the rotative part while the inner surface of the elastomeric sleeve of the torsion spring is bonded to a central sleeve or shaft 60. The sleeves 60 are suitably journaled in housing 61 which are suitably welded to the chassis support member 10. The sleeve or shaft 60 is adjustable by having one end of a paddle or lever 62 welded thereto and the other end connected to a threaded hub 64 which receives a threaded rod 65 bolted thereto as by a pair of nuts 66 on either side thereof. The other end of threaded rod 65 is pivotally connected to a support block 67 that is welded to chassis support member 10. Threaded rod 65 is adjusted by correspondingly loosening nuts 66 on rod 65 and thence effecting the adjustment in the tension of spring 57 and thence tightening the nuts 66. Such action effects adjustment of the height of the suspension system.

Upper bracket 24 has a similar construction in that it has a pair of shafts similar to shafts 26 and 27 housing bearing assemblies similar to that shown in FIGS. 3, 4, 5 and 6 except that outer hubs are designated 40' and 50' (FIG. 1). Such hubs 40' and 50' extend inwardly towards support 10 as support arms or control arms 70 and 71 joined at their intermediate portions by a bolt 72. Arms 70 and 71 have their inward most end secured to a shaft 73 which forms the inner sleeve of a torsilastic spring 75. The outer shell of torsilastic spring 75 is suitably welded or otherwise secured to the chassis support member 10 to compliment the torsion spring 57 previously described.

In the operation of the described bearing assembly and associated parts, as the wheel 20 rotates and moves in a vertical plane, the respective torsion springs 57 and 75 allow such movement while the splined shaft 14 allows axial relative movement of the wheel axle to maintain independent movement of the wheel without any load stresses thereon. The elastomeric ring 35 of the bearing assembly which is bonded to the hub 31 will allow pivotal movement about the axis of shafts 26 and 27 while simultaneously resisting radial as well as axial thrust forces in view of the conical or tapered contour thereof. The elastomeric rings 35 in allowing the pivotal action about the axis of the shafts 26 and 27 will wind up the torsion forces due to their elastomeric nature, which elastomeric springs are in compression. Upon sufficient rotational forces being encountered after winding up of the elastomeric rings, the rings can slip and rotate on the anti-friction layer of material 42 that coats the inner surface of the outer hubs 40 and 50. With the respective control arms 52 and 53 and 70 and 71 of the lower and upper torsion springs, components are tied integrally together, they compliment the diametrically opposed elastomeric rings in their ability to absorb the axial thrust forces in a facile manner to provide a cost effective bearing assembly that provides superior performance in its operation in the suspension system.

Various modifications are contemplated and may obviously be resorted to by those skilled in the art without departing from the described invention, as hereinafter defined by the appended claims, as only a preferred embodiment thereof has been disclosed.

I claim:

1. A bearing assembly for a vehicle wheel comprising a stationary wheel support bracket, a shaft extending laterally from said bracket, a sleeve mounted on and secured to said shaft, the outer surface of said sleeve tapers inwardly towards said bracket, an annular elastomeric ring bonded to said tapering outer surface of said sleeve, an elongated arm with a hub portion thereon, said hub portion having a central bore that is frustoconical in shape, said central bore of said hub frictional contacting said annular ring, and means for securing said tapering sleeve with said annular ring on said shaft wherein the surface of said central bore has a layer of anti-friction material bonded thereto for frictional engagement by said elastomeric ring.

2. A bearing assembly as set forth in claim 1 wherein said elastomeric ring is under compression.

3. A bearing assembly as set forth in claim 2 wherein the terminal free end of said shaft threadedly receives a nut for rotation thereon to selectively maintain said ring under compression.

4. A bearing assembly for a vehicle wheel comprising a stationary wheel support bracket, said bracket being mounted in a brake drum, said brake drum having a wheel rotatably mounted thereon, a drive axle connected to said wheel through said brake drum for rotating said wheel, said bracket having a pair of diametrically opposed shafts extending laterally therefrom, each of said shafts being cylindrical, a sleeve mounted on each of said shafts and keyed thereto, the outer surface of each of said sleeves tapers inwardly toward each other defining a frusto-conical configuration, an elastomeric ring of constant thickness bonded into each of said outer surfaces of said sleeves, elongated control arm members having a hub on one end and a spring means connected to the other end, said spring means connected to a vehicle support frame to provide a suspension for such vehicle in cooperation with the bearing assembly, each of said hubs having a tapered bore for frictionally receiving said elastomeric rings, means for securing said elastomeric rings and said sleeves onto said shafts, and wherein each of said tapered bore surfaces of said hub have a layer of anti-friction material bonded thereto for contacting said elastomeric rings.

5. A bearing assembly as set forth in claim 4 wherein said control arm members are interconnected to provide an integral unit.

6. A bearing assembly as set forth in claim 4 wherein each of said sleeves and their said elastomeric rings are secured onto said shafts by an adjustable member that places said elastomeric rings into compression.

7. A bearing assembly comprising a support member, a pair of shafts extending laterally outwardly from said support member, a sleeve mounted on each of said shafts and keyed thereto, the outer surface of each of said sleeves tapering inwardly toward each other and towards said support member, a layer of elastomeric material bonded to each of said outer surfaces of said sleeves to form a pair of elastomeric rings, a hub journaled on each of said elastomeric rings, each of said hubs having a central bore that is frusto-conical in shape and receives said rings, means for securing each of said sleeves and rings onto said shafts for placing said elastomeric rings under compression, and wherein each of the central bore surfaces of said hubs have a layer of anti-friction material bonded thereto for contacting said elastomeric rings.

* * * * *